United States Patent
Sickels

(10) Patent No.: US 8,546,728 B2
(45) Date of Patent: Oct. 1, 2013

(54) WELDER WITH INTEGRATED WIRE FEEDER HAVING SINGLE-KNOB CONTROL

(75) Inventor: Darrell L. Sickels, Troy, OH (US)

(73) Assignee: Illinois Tool Works Inc., Glenview, IL (US)

(*) Notice: Subject to any disclaimer, the term of this patent is extended or adjusted under 35 U.S.C. 154(b) by 2874 days.

(21) Appl. No.: 11/072,058

(22) Filed: Mar. 4, 2005

(65) Prior Publication Data

US 2006/0196862 A1    Sep. 7, 2006

(51) Int. Cl.
*B23K 9/10* (2006.01)
*H05B 7/11* (2006.01)

(52) U.S. Cl.
USPC ............... 219/137.71; 219/130.5; 219/132

(58) Field of Classification Search
USPC ................... 219/130.5, 132, 137.71
See application file for complete search history.

(56) References Cited

U.S. PATENT DOCUMENTS

| | | |
|---|---|---|
| 2,424,324 A | 7/1947 | Murcek et al. |
| 4,093,844 A | 6/1978 | Fellure et al. |
| 4,438,317 A | 3/1984 | Ueguri et al. |
| 4,510,373 A | 4/1985 | Cox et al. |
| 4,608,482 A * | 8/1986 | Cox et al. ............ 219/132 |
| 4,973,821 A | 11/1990 | Martin |
| 6,166,350 A | 12/2000 | Sickels |
| 6,930,280 B2 | 8/2005 | Zauner et al. |
| 2004/0226930 A1 | 11/2004 | Radtke |
| 2005/0161448 A1 | 7/2005 | Stava et al. |

FOREIGN PATENT DOCUMENTS

| | | |
|---|---|---|
| DE | 9301390 U1 | 5/1993 |
| DE | 19733638 A1 | 2/1999 |
| EP | 0901865 A2 | 3/1999 |
| EP | 0987079 A2 * | 3/2000 |
| EP | 1445055 A1 | 8/2004 |
| FR | 2836641 A | 9/2003 |

* cited by examiner

*Primary Examiner* — Henry Yuen
*Assistant Examiner* — Ket D Dang
(74) *Attorney, Agent, or Firm* — Fletcher Yoder P.C.

(57) ABSTRACT

A welding-type component is disclosed having a single user input that requires a user to input only a single parameter to identify a welding-type process. From the single input, operating parameters for the welding-type process automatically are set or otherwise determined. The invention streamlines the welding-type process prescription process by allowing a user to input only a single parameter than can be used to determine and coordinate other parameters for the welding-type process.

22 Claims, 11 Drawing Sheets

WELDER WITH INTEGRATED WIRE FEEDER HAVING SINGLE-KNOB CONTROL

BACKGROUND OF THE INVENTION

The present invention relates generally to welding machines and, more particularly, to a welder or wire feeder having a single-knob control knob for inputting a single identifier of a welding process from which all operating parameters of the welding process can be automatically determined. The present invention is particularly applicable with welders having an integrated wire feeder.

MIG welding, formerly known as Gas Metal Arc Welding (GMAW), combines the techniques and advantages of TIG welding's inert gas shielding with a continuous, consumable wire electrode. An electrical arc is created between the continuous, consumable wire electrode and a workpiece. As such, the consumable wire functions as the electrode in the weld circuit as well as the source of filler metal. MIG welding is a relatively simple process that allows an operator to concentrate on arc control. MIG welding may be used to weld most commercial metals and alloys including steel, aluminum, and stainless steel. Moreover, the travel speed and the deposition rates in MIG welding may be much higher than those typically associated with either Gas Tungsten Arc Welding (TIG) or Shielded Metal Arc Welding (stick) thereby making MIG welding a more efficient welding process. Additionally, by continuously feeding the consumable wire to the weld, electrode changing is minimized and as such, weld effects caused by interruptions in the welding process are reduced. The MIG welding process also produces very little or no slag, the arc and weld pool are clearly visible during welding, and post-weld clean-up is typically minimized. Another advantage of MIG welding is that it can be done in most positions which can be an asset for manufacturing and repair work where vertical or overhead welding may be required.

MIG systems generally have a wire feeder that is used to deliver consumable filler material to a weld. The wire feeder is typically connected to or integrated with a welder or a power source that powers the driver motor(s) of the wire feeder as will generate a voltage potential between the consumable filler material and the workpiece. The terms "welder" and power source" are interchangeable as both refer to a welding system component designed to condition power. This voltage potential is then exploited to create an arc between the filler material and the workpiece and melt the filler material and workpiece in a weld. Generally, control parameters are input by a user using a several knobs and switches on a control panel of the power source. Additionally, the wire feeder may also include a series of knobs and switches designed to identify parameters or operating conditions of the wire feeder. Other known wire feeders have been constructed such that control of the power source can be governed based on the inputs to the wire feeder. MIG systems have been developed wherein the wire feeder and welder are housed within a common enclosure. Such integrated systems are generally preferred by retail and infrequent users.

A variant of MIG welding is Flux-Cored Arc Welding (FCAW). With FCAW, a consumable tubular electrode has its core filled with flux and alloying agents. The sheath, or solid metal portion of the electrode, typical accounts for 80 to 85% of the weight of the electrode. During FCAW, the cored, consumable electrode is continuously delivered to the weld from a spool or other feed supply. The welding arc and weld puddle is typically shielded from the surrounding atmosphere by a shielding gas, such as carbon dioxide. However, gas-less FCAW systems have been developed for open-arc welding by introducing fluxing materials that provide greater quantities of smoke for shielding purposes. This is advantageous in windy conditions where the shielding gas would normally be blown away. One exemplary gas-less FCAW system is the Handler® 125 integrated welder and wire feeder commercially available from Hobart Welders of Troy, Ohio, a subsidiary of Illinois Tool Works Inc. of Glenview, Ill. HANDLER is a registered trademark of Illinois Tool Works Inc. Flux-cored MIG welding is typically performed with a welder specifically configured for FCAW, such as the Handler®125 commercially available from Hobart Welders; however, other welders have been developed that are capable of FCAW and other MIG welding processes, such as the Handler® 140 commercially available from Hobart Welders.

Flux-cored welding is often a preferred welding process when wire welding in an environment where a shielding gas cloud might be blown away. Flux-cored welding is also considered a relatively easy welding process and, as a result, is often preferred by infrequent, inexperienced, and retail users. Flux-cored welding is also applicable with a wide range of materials and wire diameters (wire thicknesses). High travel or deposition rates are also supported by FCAW which reduces weld time.

With MIG welding and its variants, such as FCAW, it is critical that a user properly identify the operating parameters of the welder (power source) and/or wire feeder. To achieve consistent and proper operation, a user must enter identifiers or parameters of a welding process that are consistent with one another. For example, an inexperienced user may input the value for a desired weld voltage that is inconsistent given the wire feed speed value also input by the user. That is, the voltage potential created between the driven consumable filler and the workpiece is inversely proportional to the speed or velocity by which the consumable filler is delivered. As such, as wire feed speed increases, weld voltage decreases. Therefore, the user may input values for weld voltage and wire feed speed that are incongruous. In other words, the power source may be unable to deliver a voltage at the level desired by the user given the speed the wire feeder is delivering filler material to the weld, and vice-versa.

Systems have been developed to simplify the prescription process of a welding session. Some of these systems use costly, heat generating, complex circuits and controls that pre-determine if the desired output parameters can be attained given the multiple user inputs and, if not, provide an error message on an LCD or other display to the user. While advantageous for the inexperienced or infrequent user, an error message may add to the complexity of the prescription process as the user may not know what changes are necessary to the inputs to reach the desired output. Other systems have attempted to solve this problem by reducing the number of control knobs, selectors, and the like; however, for inexperienced or infrequent users, simply reducing the number of controls can add to the complexity of the prescription process and may add to the confusion as the user must comprehend the interrelationship between the various settings commanded by user manipulation of the controls. Absent this understanding, the user may have difficulty in prescribing or carrying out a welding session.

Therefore, it would be desirous to have a welding-type component whose operation can be repeatedly and effectively defined in only a single user-input. In this regard, it would be desirable to have a system that reduces the complexity typically associated with defining a welding-type process. It would be further desirable to have an FCAW welder/wire feeder whereupon a single identification of weld material thickness is the only input necessary to establish operating parameters of the FCAW welder/wire feeder.

BRIEF DESCRIPTION OF THE INVENTION

The present invention solves the aforementioned drawbacks with a single knob or equivalent device to input a single parameter or identifier of a welding-type process such that the operating parameters for the welding-type process can be automatically determined from the single user-input.

A welding-type component, e.g. wire feeder, power source, and the like, is equipped to have a single input device capable of identifying a single parameter of a welding-type process. From the single user-input, the parameters of the welding-type process are determined. In this regard, a user need only provide a single input when establishing a welding-type process. In one exemplary embodiment, a user identifies a material thickness of a material to be weld during a welding process and from that single input, operating parameters of the wire feeder and power source, such as weld voltage and wire feed speed, are automatically set. Thus, the present invention is designed, in one aspect, to simplify and streamline prescribing a welding-type process. The present invention is applicable with welding systems having stand-alone welders and wire feeders as well as integrated welders and wire feeders. The invention is also applicable with general MIG welding systems as well as variants thereof, such as FCAW systems.

Therefore, in accordance with one aspect, the present invention includes a welding-type system having a control panel that includes only a single input device configured to allow a user to input a single identifier of a welding-type process. The system further has operational circuitry configured to establish operating parameters for the welding-type process from the single identifier.

In accordance with another aspect of the present invention, a controller is configured to receive a user-input identifying a weld material thickness and, from the user-input, determine operating parameters of a welding-type component. The controller is also configured to control the welding-type component to deliver an output consistent with the determined operating parameters.

According to another aspect, the present invention includes a welder having a single means for establishing a welding-type process as well as means for determining operating parameters for the welding-type process from an input to the single establishing means. The welder also has means for controlling the welding-type process consistent with the operating parameters.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to an integrated welding system wherein the welder and the wire feeder are housed within a common enclosure. However, one skilled in the art will readily appreciate that the present invention is also applicable with a "non-integrated" system having a stand-alone welder and a stand-alone wire feeder. Furthermore, the invention will be first described with respect an integrated welder/wire feeder designed only for FCAW. However, as will be described with respect to FIGS. 5-8, the present invention is also applicable with multi-process welding systems.

Figure 1:
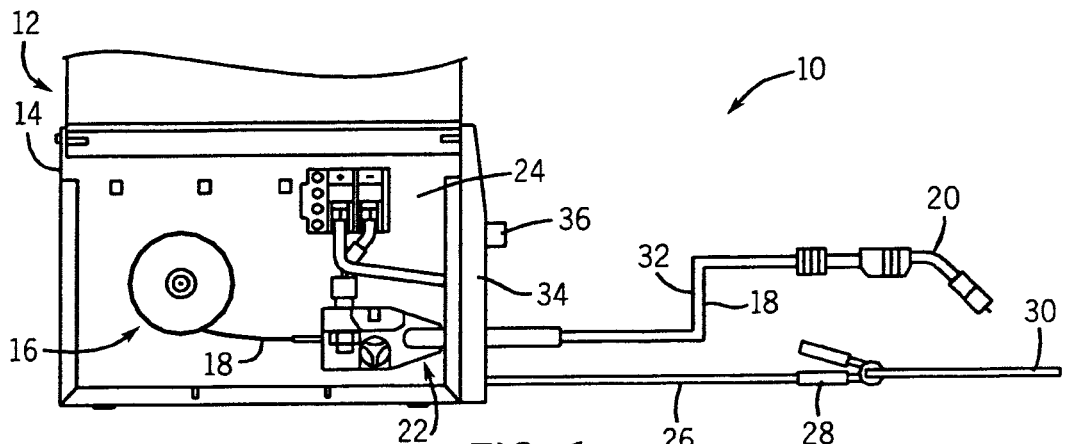
FIG. 1 is a schematic cross-sectional view of an integrated welder/wire feeder applicable with the present invention.

A cross-sectional view of an exemplary integrated welder/wire feeder is illustrated in FIG. 1. As shown, welding system 10 includes an integrated welder/wire feeder 12 having a single housing 14 that encloses the components of a wire feeder as well as the components of a welder. As shown, disposed with housing 14 is a spool 16 of consumable welding wire 18. The wire may be flux-cored or self-shielding flux-cored. The wire 18 is translated from the spool 16 to a welding gun 20 by motor and drive assembly 22. The integrated welder/wire feeder 12 also includes a power conditioner assembly 24 designed to condition a raw power input into a form usable by the welding process. Extending from the welder/wire feeder 12 via a weld cable 26 is clamp 28. Clamp 28 is designed to complete the electrical circuit with the workpiece 30 during the welding process. The welding gun 20 is connected to the integrated welder/wire feeder 12 across weld cable 32. As will be described in greater detail below, the integrated welder/wire feeder 12 has a control panel 34 having a single-knob control 36 for a user to input a single identifier or parameter of the welding process. One skilled in the art will appreciate that while preferably on front panel 34, the single-control knob may be conveniently positioned on any of the side panels or the back panel. In addition to knob 36, welder/wire feeder 12 may also have a dedicated ON/OFF switch to turn the system ON and OFF. It is also contemplated that such an ON/OFF selection may also be integrated into the single control knob 36.

Figure 2:
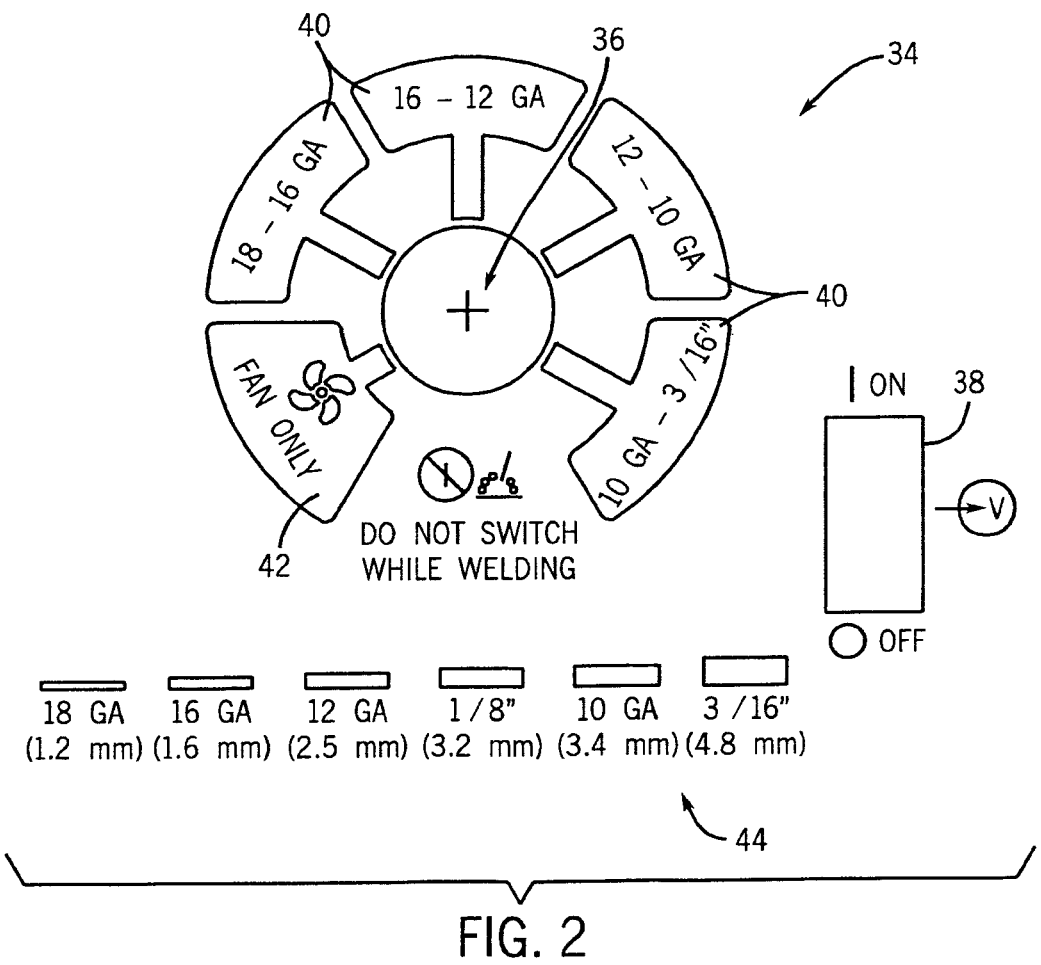
FIG. 2 is an elevational view of an exemplary control panel of a welding-type component in accordance with one aspect of the present invention.

As referenced above, welder/wire feeder 12 is an integrated system designed, in one embodiment, to carry out a FCAW process wherein a flux-cored consumable wire is fed to a weld. In this regard, it is contemplated that welder/wire feeder may operate in a gas-less mode and thus deliver a self-shielding, flux-cored consumable to the weld. The integrated welder/wire feeder 12 includes a control panel 34 that preferably has only an ON/OFF switch (not shown) and a single control knob 36. An elevational view of the control panel 34 is shown in FIG. 2 which illustrates the preferred single knob 36 and an ON/OFF switch 38. While an ON/OFF switch 38 is shown in addition to the control knob, it is contemplated that the control knob may be configured to rotate to an ON/OFF position and thus eliminate the need for switch 38. Additionally, while a rotatable, variable-positional knob 36 is illustrated, it is contemplated that other user-input devices may be used including, but not limited to switches and push-buttons.

Referring now to FIG. 2, control panel 34 includes, in one embodiment, an ON/OFF switch 38 vertically positioned in a lower-right corner of the control panel 34; although, other locales are contemplated. The ON/OFF switch 38 is designed to receive a pushing force from a user such that the switch is depressed in the ON direction when it is desired to turn the system ON and depressed in the OFF direction when it is desired to turn the system OFF. It is recognized that other devices may be used in place of the illustrated push-button switch to selectively control the welder/wire feeder between an ON state and an OFF state, such as a multi-position, rotatable knob and the like.

The control panel 34 also includes control knob 36 that, in the illustrated embodiment, is designed to be rotated to one of a number of discretely defined positions 40. In the illustrated embodiment, each of the defined positions corresponds to a range of work-piece material thicknesses or gauges. In a preferred embodiment, in addition to a multitude of material thickness positions, a "FAN ONLY" position 42 is also provided.

Control knob 36, in the embodiment illustrated in FIG. 2, is designed to be positioned at one of the material thickness selection positions 40 or the fan only position 42. In this regard, control knob 36 is not designed to be positioned between any two positions. That is, as shown in the labels for each position 40, there is not a material thickness setting defined between positions 40. As such, each position 40 defines a range of material thicknesses. In the illustrated example, there is an "18-16 GA" position, a "16-12 GA" position, a "12-10 GA" position, and a "10 GA-3/16 in." position. One skilled in the art will readily appreciate that the above ranges are merely exemplary and that other material thicknesses are contemplated. Additionally, it is also contemplated that other parameters instead of or in addition to material thickness may also be used to identify particulars of a welding process. As further shown in FIG. 2, in a preferred embodiment, control panel 34 includes a legend 44 to assist a user in identifying the gauge of a weld material from knowledge of its thickness, and vice-versa. In an exemplary embodiment, welder/wire feeder 12 is designed to only carry out an FCAW process. As such, each of material thickness selection positions 40 corresponds to a range of weld material thicknesses. As will be described, by only identifying the corresponding material thickness, operating parameters for the FCAW process are set. In one embodiment, wire feed speed is pre-set; therefore, only a weld voltage need be determined from an input to the single-knob control 36.

As referenced above, in one embodiment, the present invention is directed to an FCAW welder/wire feeder that requires a user to input only a single parameter, i.e. material thickness, to prescribe an FCAW welding process. Accordingly, circuitry in the welder/wire feeder is designed to receive the single user input and from that single user input automatically set operating parameters of the components of the welding-type system. In the example illustrated in FIG. 2, a single input of material thickness is required and, from only that material thickness selection, operating parameters of a welder/wire feeder, such as weld voltage, are automatically set. This is particularly advantageous for infrequent or inexperienced users that are not aware of the optimal weld voltage and wire feed speed for a given wire diameter and material thickness. As such, the invention enables a user to identify the gauge of the material to be weld by the welder/wire feeder and from that characteristic, the operating parameters of the welder/wire feeder are determined. In a preferred embodiment, no other user inputs are needed to prescribe the welding session than the single input provided with positioning of control knob 36. As will be described, the operating parameters may be set by a controller defined by operational circuitry, a microprocessor, or a combination of both. That is, for purposes of this application, "controller" shall not be considered limited to only microcontroller or microprocessor-based configurations. While the "controller" disclosed herein may include a microcontroller or a microprocessor, neither is required. As such, the disclosed "controller" may be comprised of non-programmable operational circuitry, such as a voltage divider circuit.

Figure 3A:
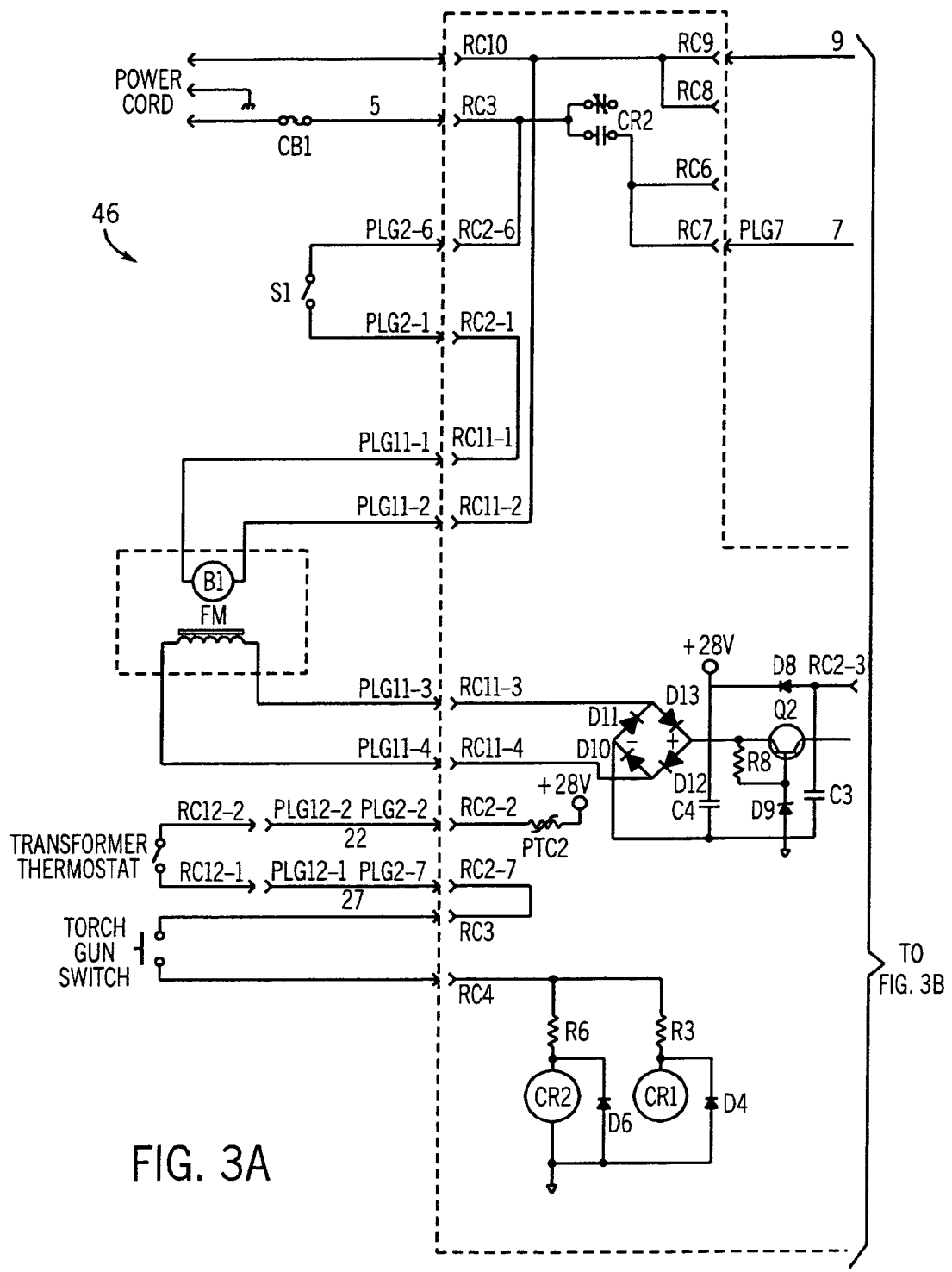
FIGS. 3A-3B is a schematic diagram illustrating an exemplary circuit for controlling operation of a welding system in accordance with one aspect of the present invention.
Figure 3B:
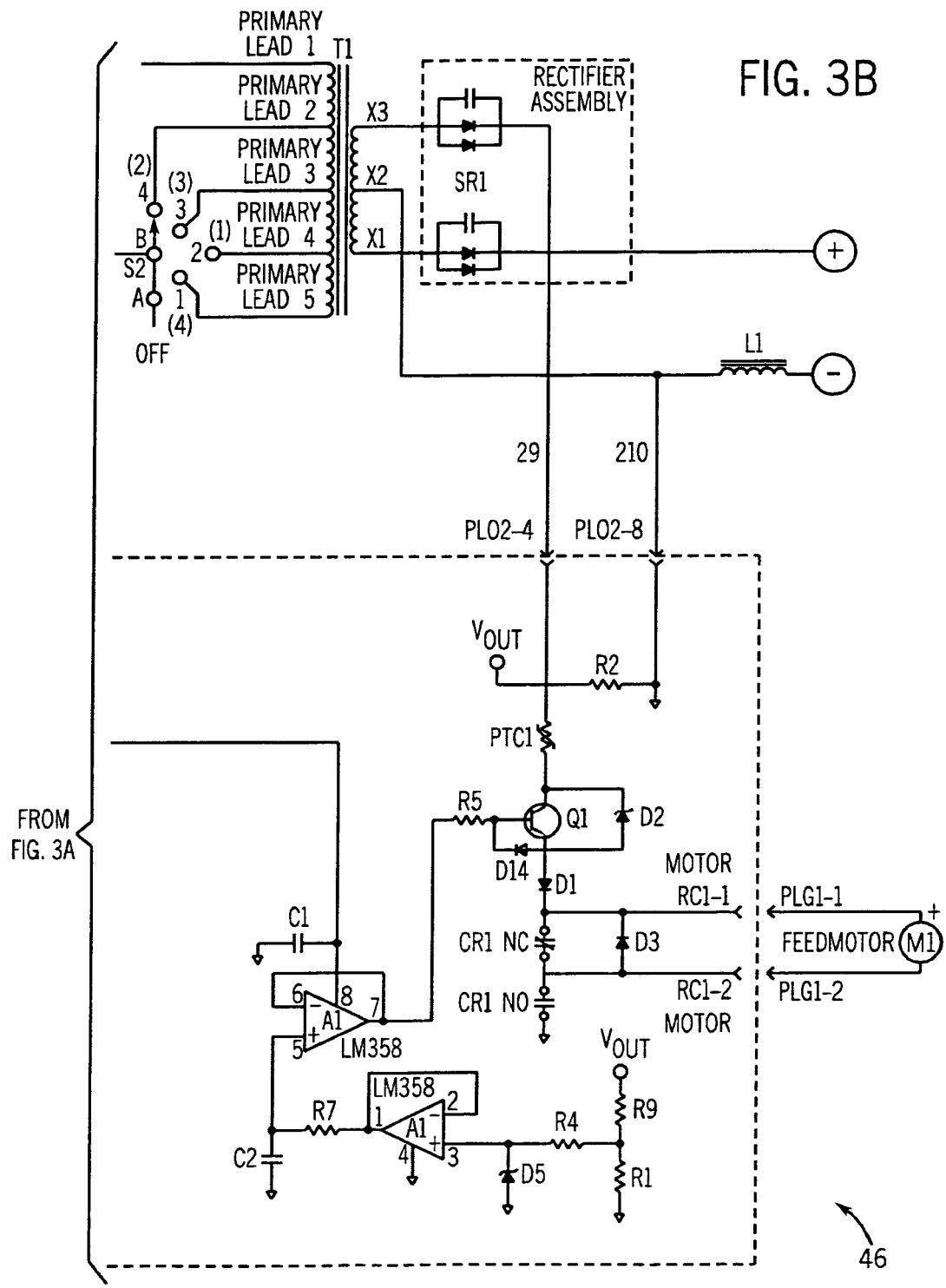

Referring now to FIGS. 3A-3B, a schematic diagram illustrates an exemplary circuit in accordance with one embodiment of the present invention. In this embodiment, operating parameters are determined directly within a circuit rather than with a microprocessor and associated algorithms. One skilled in the art will appreciate that the electronic components and the interrelation thereof illustrated in FIGS. 3A-3B is but one contemplated circuit and that other circuit arrangements as well as other electronic components are contemplated.

Circuit 46 includes a transformer-rectifier power supply that includes a transformer T1 and a rectifier assembly SR1. Transformer T1 is designed to step down an input voltage to a voltage suitable for the welding process. In a preferred embodiment, transformer T1 is designed to step down a 115 VAC input to a voltage level suitable for welding flux-cored wire. The voltage is controlled through a tapped-primary scheme in which range switch S2 selects the desired primary tap. Rectifier assembly SR1 rectifies the secondary output of the transformer T1 to provide a full-wave rectified signal to the weld output. Inductor L1 smoothes (filters) the weld output current to provide a stable welding arc. Circuit 66 also includes a relay CR2 that is controlled by the trigger switch of a welding gun and is used to switch the welding output ON and OFF.

Control board power is developed from a 24V secondary winding on fan motor FM. Power switch S1 switches the input 115V to the control winding of the fan motor B1. Diodes D10, D11, D12, and D13 rectify the 24V input to the board. Series-pass regulator, comprised of transistor Q2, resistor R8, and diode D9, clamps the rectified voltage to 29V. The 29 VDC is used as the power supply for operational amplifier A1.

The weld voltage is divided by resistors R9 and R1 and presented to the base of the series-pass transistor Q1 by noninverting unity gain amplifier A1. The wire feed motor is driven by the scaled voltage from R9 and R1 through Q1. The scaled voltage is thus fixed directly on the control board rather than through a potentiometer or other component that is presented to the user for controlling wire feed speed. As such, a user need only be concerned with the voltage control S2 for the material thickness selection. As the weld voltage varies due to changes in the output voltage or arc length, the motor speed changes. This provides a wire feed speed tracking that in concert with the fixed motor speed reference on the control board provides a stable welding arc throughout the specified material thickness range identified in the single user input by varying the output voltage only.

As referenced above, voltage control S2, which is responsive to the single control knob, is used to set the primary tap on transformer T1. As such, each range of material thicknesses selectable by a user through control knob 36, corresponds to a weld voltage that is achievable based on the primary tap selected when the control knob is positioned.

Thus, the wire feed speed is initially fixed directly within the circuit. As the output voltage changes, the wire feed speed will also vary to accommodate the fluctuations present at the weld.

Figure 4:
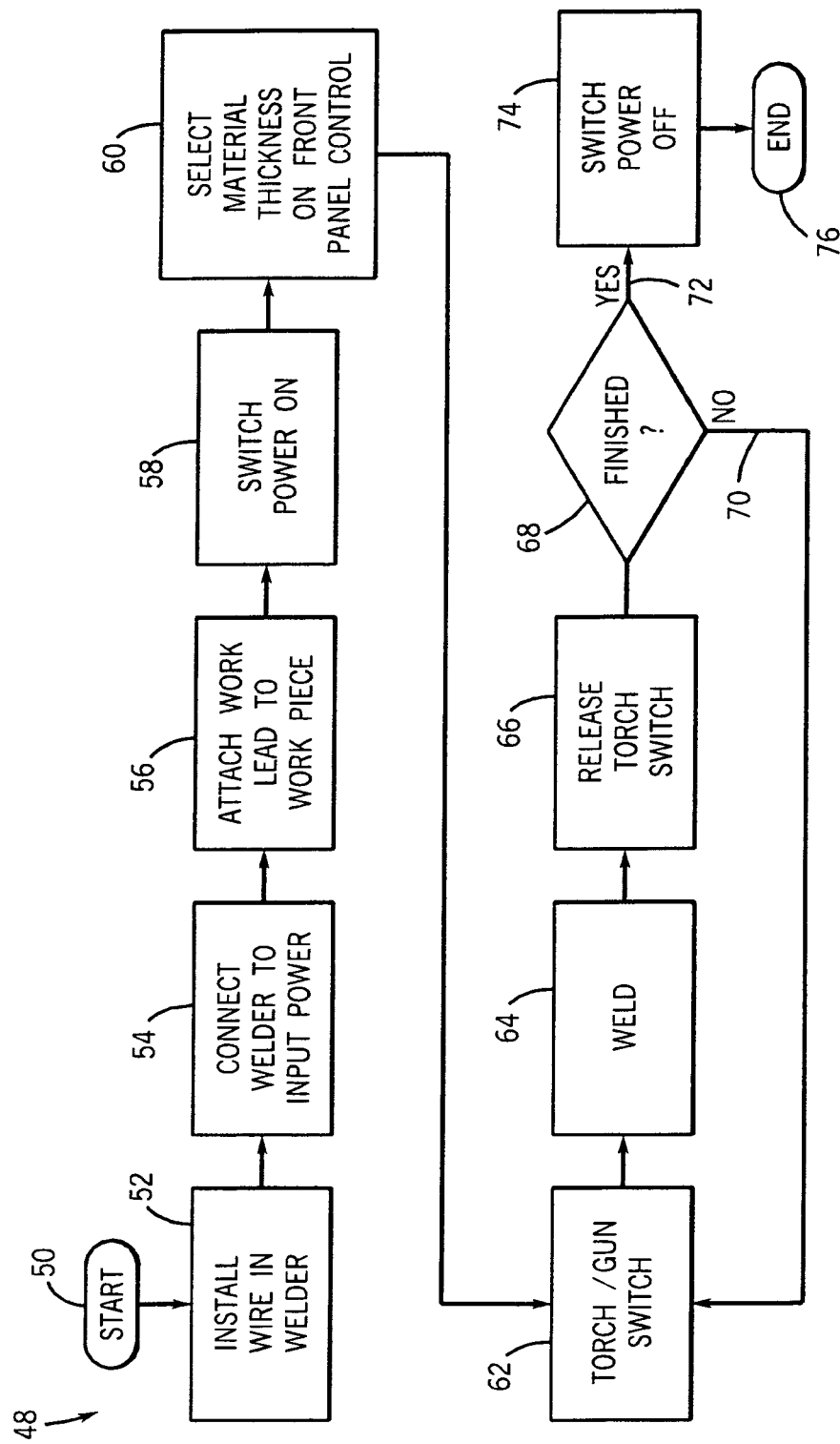
FIG. 4 is a flow chart setting forth the steps of defining and carrying out a welding process with a welding session incorporating the present invention.

As described above, in one embodiment, the present invention is directed to a welder/wire feeder for FCAW that allows a user to simply identify a weld material thickness and from that single identifier, operating parameters, such as weld voltage, are set. FIG. 4 illustrates the steps of a process for carrying out welding in accordance with one embodiment of the invention. The exemplary welding process 48 begins at 50 with user installation of consumable wire at 52. As described, the invention is applicable to both integrated and stand-alone welding systems. As such, the wire may be installed into a stand-alone wire feeder or an integrated welder/wire feeder. Additionally, for purposes of illustration only, the wire is presumed to be a type of flux-cored wire as the welder/wire feeder is specially designed for flux-cored welding. After the wire is installed 52, the welder is preferably connected to an input power supply 54. It is contemplated that the power supply may be provided from a utility line as well as an engine-driven source. After the welder is connected to the input power supply 54, the work lead is attached to workpiece 56 whereupon the welder/wire feeder is turned ON. It is contemplated that the welder/wire feeder may be turned ON using a dedicated ON/OFF switch or rotating the single control knob from an OFF position to an ON position or position associated with an ON state.

Once the welder/wire feeder is powered ON 58, the user then identifies a material thickness using the aforementioned single control knob position on the front panel of the welder/wire feeder 60. As described above, operating parameters for the welder/wire feeder will be automatically determined and/or set from the user input for identification of the thickness of the material to be weld. In one preferred embodiment, wire feed speed is pre-set and, as a result, the only parameter to be determined is weld voltage. After the user has rotated the single control knob to the corresponding material thickness 60, the user may begin the welding process by depressing the trigger or other activation device of the welding gun at 62. As a result thereof, the welder/wire feeder provides the appropriate weld voltage based on the user-identified material thickness such that welding can commence at 64. Welding will continue until the gun or torch switch is released at 66. If the user has not completed the welding session 68, 70, the process returns to 62 and awaits user reactivation or retriggering of the welding gun. Otherwise 68, 72, it is preferred that the user power OFF the welder/wire feeder by switching the ON/OFF switch to an OFF position at 74. As referenced above, the ON/OFF switch may be integrated with the material thickness selector control knob and, as such, the user may power down the welder/wire feeder by rotating the control knob to an OFF position. Thereafter, process 48 ends at 76.

Heretofore, the present invention has been described with respect to an integrated welder/wire feeder. Moreover, the present invention has been described with respect to an integrated welder/wire feeder specially designed for FCAW. However, as set forth below, it is contemplated that the present invention may also be incorporated into stand-along welding systems as well as welding systems capable of carrying out other welding processes in addition to, or in place of, flux-cored welding.

Figure 5:
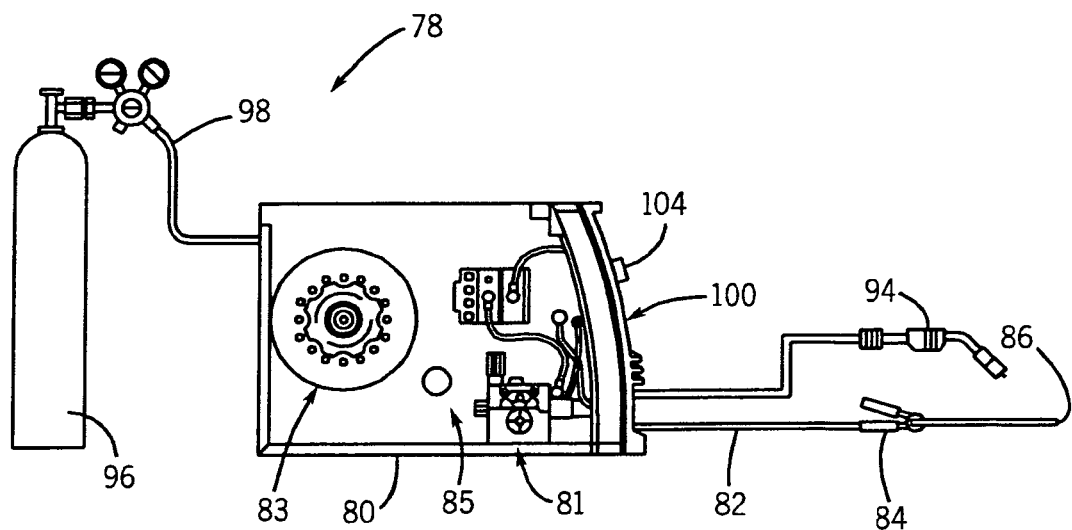
FIG. 5 is a schematic cross-sectional view of an MIG welding system applicable with the present invention.

Referring now to FIG. 5, in accordance with another embodiment of the present invention, a welding-type system 78 is shown having an integrated welder/wire feeder configured for MIG operation. The power source/feeder 80 has a work cable 82 and clamp 84 designed to hold a workpiece 86 and establish an electrical circuit for welding. The welder/wire feeder 80 also includes a welding torch or gun 94. A shielding gas cylinder 96 is also shown connected to the wire feeder 80 to provide shielding gas through hose 98 for the welding process. Furthermore, the wire feeder may be constructed to operate without gas and, thus, the present invention is also applicable with "gas-less" flux-cored wires.

The welder/wire feeder 80 includes a wire drive assembly 81 that includes a spool of welding wire 83 that is supplied to the weld under control of a controller (not shown). The controller is governed by a microprocessor/microcontroller capable of being programmed to operate according to certain algorithms and/or programs. User selections or inputs received by the controller from a display and control panel 100 and an internally programmed algorithm cause welding system 78 to operate according to a user selection. The wire feeder preferably has only an ON/OFF switch (not shown) and a single control knob 104 for identifying/inputting an operating parameter to the welder/wire feeder 80.

When the welding torch 94 is positioned proximate to workpiece 86, welding wire is fed into contact with the workpiece 86. Once triggered, an electrical current and voltage are generated to cause the welding wire to be heated and melt. As a result, an electrical arc is established which causes the welding wire to continue to melt as well as transfer the melted welding wire to the workpiece 86 where the welding wire fuses and cools with the workpiece 86. Because the electrical energy supplied to the welding system is typically greater than that required to melt the welding wire, most of the remaining energy is in the form of heat which is transferred to the surface of the workpiece 86 resulting in the workpiece 86 also melting and improved bonding between the melted welding wire and the workpiece 86. As the welding torch 94 is translated across the workpiece 86, melted welding wire is continuously transferred to the workpiece 86.

Still referring to FIG. 5, the welder/wire feeder includes a wire compartment that has a wire type and a gas type selector 85. In this regard, when installing the wire and connecting gas to the wire feeder, the user identifies the type of wire and gas that have been installed and connected, respectively. In combination with the weld material thickness identified via the control knob, the microcontroller knows the gas type, wire type, and wire thickness (diameter). From this information, the microcontroller then determines either from a look-up table or on-the-fly the output or weld voltage and the appropriate wire feed speed. In this embodiment, the wire feeder is equipped to handle several variations and combinations of wire type and gas type. Moreover, since the voltage reference is infinitely variable and the internal voltage and wire feed speed controls can be controlled with potentiometers, there is adjustability between indicated thickness settings that allows a user to more precisely control the welding process. An exemplary circuit diagram for carrying out this alternate embodiment of the invention is illustrated in FIG. 6.

Referring now to FIGS. 6A-6E, an exemplary circuit schematic illustrating an alternate embodiment of the present invention is shown. Similarly to that heretofore described, the circuit 106 is designed to establish operating parameters of a welding-type system based on a single user input via a single control knob or equivalent device. Additionally, the exemplary circuit is constructed to be applicable with a welding-type system that is capable of carrying out welding with a variety of shielding gas types, consumable wire types, and wire diameters, such as that shown in FIG. 5. In this regard, when a user first installs the consumable wire in the wire feeder and connects a shielding gas, the user preferably sets a process identity switch 85 located in the wire compartment of the wire feeder to the proper position. This is a one-time setup whenever a different wire or gas type is to be used. Once installed, all control of the welding system components is from the single control knob 104 that is preferably on the front panel of the wire feeder or power source. In the circuit illustrated in FIG. 6, the process identity switch is shown as a 12-position rotary switch S2, but can be any number of positions depending on the desired number of processes for the welding-type system. The following table relates switch position to process type.

TABLE 1

| Switch Position | Wire Diameter (inches) | Shielding Gas | Base Material/ Wire Type |
|---|---|---|---|
| 1 | .024 | C25 | Steel/Solid |
| 2 | .030 | C25 | Steel/Solid |
| 3 | .035 | C25 | Steel/Solid |
| 4 | .024 | CO2 | Steel/Solid |
| 5 | .030 | CO2 | Steel/Solid |
| 6 | .035 | CO2 | Steel/Solid |
| 7 | .030 | n/a | Steel/FCAW |
| 8 | .035 | n/a | Steel/FCAW |
| 9 | .030 | Argon | Aluminum/Solid |

The circuit includes a micro-controller or micro-processor U1 which detects the position of switch S2 and either from a look-up table or on-the-fly associates a detected switch position to a selective welding-type process. For example, it is contemplated that the present invention is applicable with a welding-type system capable of solid and flux-cored welding for various consumable wire diameters and gas types.

To conserve the number of input pins to the microprocessor U1, the process selector switch S2 is connected to two priority encoders U7, U8, which are logically OR'ed together by U9 to convert the twelve possible switch selections into a 4-bit hex number that reads on port pins, RC0-3. Table 2 sets forth the bit pattern for fifteen separate and distinct switch positions at which the process identity knob S2 can be positioned.

TABLE 2

| Switch Position | RC3 | RC2 | RC1 | RC0 |
|---|---|---|---|---|
| 1 | 0 | 0 | 0 | 0 |
| 2 | 0 | 0 | 0 | 1 |
| 3 | 0 | 0 | 1 | 0 |
| 4 | 0 | 0 | 1 | 1 |
| 5 | 0 | 1 | 0 | 0 |
| 6 | 0 | 1 | 0 | 1 |
| 7 | 0 | 1 | 1 | 0 |
| 8 | 0 | 1 | 1 | 1 |
| 9 | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |

With 115 VAC applied to the primary winding of the fan motor FM, the fan motor FM will turn thereby cooling the welding power source. Also, the fan motor FM has a control winding that is used to supply control power to the welding power source. When 115 VAC is applied to the primary winding of the fan motor FM, the control winding is rated to perform at 23.6 VAC at no load and 21.9 VAC with a one-half amp load. The output of the fan motor control winding is full-wave rectified by diodes D12, D13, D14, and D15. The full-wave rectified signal is passed through D19 and filtered by capacitor C21 into a smooth DC signal. In one preferred embodiment, the smooth DC signal has an amplitude of 27.0 volts DC. The filtered 27.0 VDC is regulated by a voltage regulator U2 to 5.0 VDC. The output of the regulator is determined by the following:

$$V_{out}=1.25V(1+R2/R1)+I_{adj}R2=1.25V(1+1000/332)+(0.0001\times1000)=5.1V$$

Capacitor C19 filters the output of the voltage regulator U2. Diode D20 is also provided to protect the low impedance output of the voltage regulator U2 in the condition where the input of U20 is shorted to circuit common. Capacitor C19 will discharge through diode D20 instead of during the low impedance output of U2. The exemplary circuit preferably includes an LED3 that illuminates from the presence of a 5V power supply.

The exemplary circuit preferably includes a zero-crossing detection component. In this regard, the signal at the anode of diode D19 is the full-wave rectified line signal discussed above. In a preferred embodiment, this signal goes to 0V every 8.3 msec. Each time the signal at the anode of diode D19 drops below 1.4V (diode drop of D18 plus emitter-base drop of transistor Q6), transistor Q6 is switched OFF; which in turn switches transistor Q8 OFF, in removing the voltage across resistor R46. When the signal at the anode of diode D19 rises above 1.4V and switches transistor Q60N, transistor Q8 is switched ON, which applies 5V across resistor R46. This creates a pulse which is synchronized to zero-crossings of the AC line at 120 Hz. To properly act as switches, transistors Q16 and Q8 operate in a saturation mode and, as such, the base current drive resistors must be sized appropriately. Preferably, each current drive resistor drives 1.5 mA through a 10K resistor in its collector circuit, resistor R47 for transistor Q6 and resistor R45 for transistor Q8. The normal gain ($h_{fe}$) of each transistor is 100, so the base drive resistor is preferably 1 M Ohm or lower. A 10K Ohm resistor is shown to apply 1.5 mA of base drive current. The zero-crossing pulses are then fed into the microcontroller U1. This allows the microcontroller to fire the SCR's Q2 and Q3 at the desired time relative to the zero-crossing.

The exemplary circuit includes a gun switch signal circuit. When the welding gun switch is closed, 27V is applied through RC2-16 to the base drive resistor R31 into the base of transistor Q12. Transistor Q12 is turned OFF which turns ON transistor Q13. When transistor Q13 is turned ON, 5V is applied across resistor R64 which drives pin RB0 of the microcontroller U1 HIGH thereby indicating a gun switch closure. When the gun switch is released, RB0 is pulled LOW through resistor R64 when transistors Q13 and Q12 turn OFF.

Circuit 106 also includes an input contactor component that when a closure of the welding gun switch is detected, the microcontroller sets bit RB2 HIGH which turns transistor Q10 ON. This allows relays CR2 and CR3 to energize. Once the contacts of relays CR2 and CR3 closes, the input line voltage (115 VAC) is applied to the SCR circuit and RC6. The contacts of relay CR2 are available so that this same control can be used for 230V operation.

The exemplary circuit also includes an over-temperature detection component. In this regard, the 27V power supply exits the circuit through RC2-3 and goes through power transformer T1 thermostat which is normally closed and re-enters the circuit at RC2-9. When the thermostat contacts are closed as in normal operation, transistor Q5 remains ON which pulls RB7 of the microcontroller LOW. In the event the transformer thermostat opens due to an over-temperature condition, transistor Q5 will turn OFF and allow resistor R19 to pull RB7

HIGH. Whenever the microcontroller senses that RB7 is HIGH, the gun switch signal is ignored. When an over-temperature condition is present, the microcontroller will drive RB6 HIGH which turns ON transistor Q9 thereby lighting an over-temperature LED D1.

The exemplary circuit also includes a gun trigger lead protection component. Since the gun switch circuit extends into the welding torch, there is potential risk of torch damage. One such failure mode might cause the gun switch circuit to be shorted to the weld output at the power source. The power supply gun switch circuit is protected against the short to the weld output by blocking diode D16 and PTC2. The holding current of the PTC is 200 mA. If one or both of the gun switch leads are shorted at the weld output, the PTC will have current in excess of 200 mA through it and it will switch to a high impedance. This effectively opens the circuit resulting in the removal of the gun switch signal. The PTC will remain in its high impedance state until power is removed from the circuit by switching the power switch off thereby allowing the PTC to cool. Once the PTC cools, it will return to its normal low impedance state until it sees another over-current condition. One skilled in the art will appreciate that a number of different Positive Thermal Coefficient (PTC) components or similar thermal control components may be implemented.

Circuit 106 also includes an arc voltage control component. In this regard, the front panel metal thickness control S2 is used to establish a reference for arc voltage control. The voltage reference is set by the voltage divider network of resistors R59, R60, R61, R62, and the 50 k Ohm front panel potentiometer. The reference signal is read by an A/D port in A4 of the microcontroller U1. The microcontroller U1 compares its value against a look-up table specified by the process control switch S2 and adjusts the digital potentiometer U6 that is connected to A1-10 to provide a proper error signal reference at A1-10. The output voltage of the power source is fed into pins RC3-3 and RC3-4 of the microcontroller. The output voltage is scaled down by a factor of 10 by voltage divider circuit, resistors R10, R52, and R7. The scaled voltage is fed into a differential amplifier circuit A1 across pins 12, 13, and 14. The output of A1-14 (Vout/10) is fed into pin 6 of the differential amplifier circuit of A1. The scaled voltage feedback is subtracted from the error signal reference by the differential amplifier circuit whereupon the error signal is supplied to the A/D input RA1 of the microcontroller. The value of the error signal is used by the microcontroller based on a look-up table to determine the amount of time to wait within the 8.3 msec time duration of one-half of the input line period before providing a firing pulse to the SCR by driving RB5 of the microcontroller HIGH. When RB5 goes HIGH, transistor Q7 is turned ON which lights the LED and the opto-coupler U3 which turns on an internal triac. When the opto-coupler U3 turns ON, a gate current is supplied to either transistors Q2 or Q3 depending upon a polarity of the AC input line. Diodes D5 and D6 provide current to the proper SCR gate through resistor R9 and an opto-coupler thereby allowing one SCR to be switched on at a time. This closed loop system regulates to the desired voltage as referenced by the front panel control and the look-up table. Preferably, a gain of the error loop is set to a sufficiently low value as to provide sufficient droop in the output volt/amp characteristic of the power source to maintain a stable arc.

The exemplary circuit further includes a feed motor control component. The wire feed motor is powered directly from the arc voltage which enters the circuit at RC-3 and RC3-4. PTC1 provides over-current protection to the motor circuit. The holding current of the PTC is rated at 1.85 amps. The normal operating current of the motor while feeding wire is preferably 0.9 amps. If the motor is stalled due to a feed problem, the motor will draw excess current and cause the PTC to switch to a high impedance state thereby effectively opening the motor circuit. The rated trip current of the PTC is preferably 3.7 amps. The PTC will remain in its high impedance state until power is removed from the circuit and the PTC is allowed to cool. When the gun switch is closed to initiate the arc relay, CR1 energizes which provides a current path through transistor Q5, diode D7, and the motor winding. The voltage supply for the motor is determined by a series-pass regulator transistor Q1. The regulator voltage is set by the output of the operational amplifier A2. The voltage output of operational amplifier A2 is controlled by the adjustment of the digital potentiometer U4. The digital potentiometer sets a reference voltage at the operational amplifier A2. This reference is fed from the Vout/10 signal applied by operational amplifier A1. Therefore, as the arc voltage changes, the wire feed speed reference tracks the change to produce a wire feed speed tracking function. The value of the digital potentiometer is set by the microcontroller by reading the front panel material thickness reference and comparing the value to that stored in a look-up table or determined on-the-fly.

To enable the potentiometer to utilize the wire feed speed tracking feature and stay at a desired value, the exemplary circuit includes an analog switch that is employed to switch a fixed reference through the potentiometer so that it can be read with the fixed reference applied. After the setting is verified with the fixed reference, the fixed reference gates are opened and the gates that connect to the potentiometer to the Vout/10 reference are closed. The circuit also includes a 51V zener transient voltage suppressor D6 that is connected across the collector-emitter junction to clip high transient voltage spikes to protect transistor Q5. When the gun switch is released to stop the arc, relay CR1 de-energizes. The normally-closed contacts of relay CR1 short out the motor winding which creates a dynamic braking effect. As a result, the motor stops virtually instantaneously. One skilled in the art will appreciate that resistors R1 and R2 provide a discharge path for the output capacitor of the power source.

The exemplary circuit also includes components for short circuit detection. Specifically, when the microcontroller determines that the arc voltage drops below and remains at a value below a known threshold for sustained arc, the microcontroller determines that the gun tip has been shorted to the workpiece and ignores the ON switch circuit. The gun switch circuit will not be recognized until the trigger has been released and the fault has been cleared, either as the tip is broken free or pulled from the workpiece.

FIGS. 6A-6E illustrates one of a number of circuit configurations that may be designed to carry out this embodiment of the present invention. That is, one skilled in the art will appreciate that the components illustrated as well as the inter-relationship therebetween in circuit 106 is exemplary and that other components, as well as other configurations are contemplated and considered within the scope of the invention.

Figure 7:
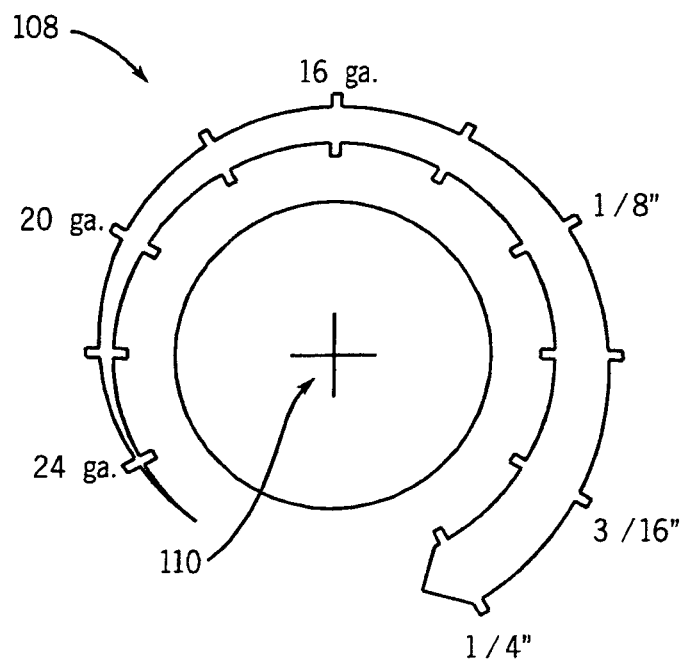
FIG. 7 is an elevational view of an alternate control panel of a welding-type component in accordance with another aspect of the present invention.
Figure 6A:
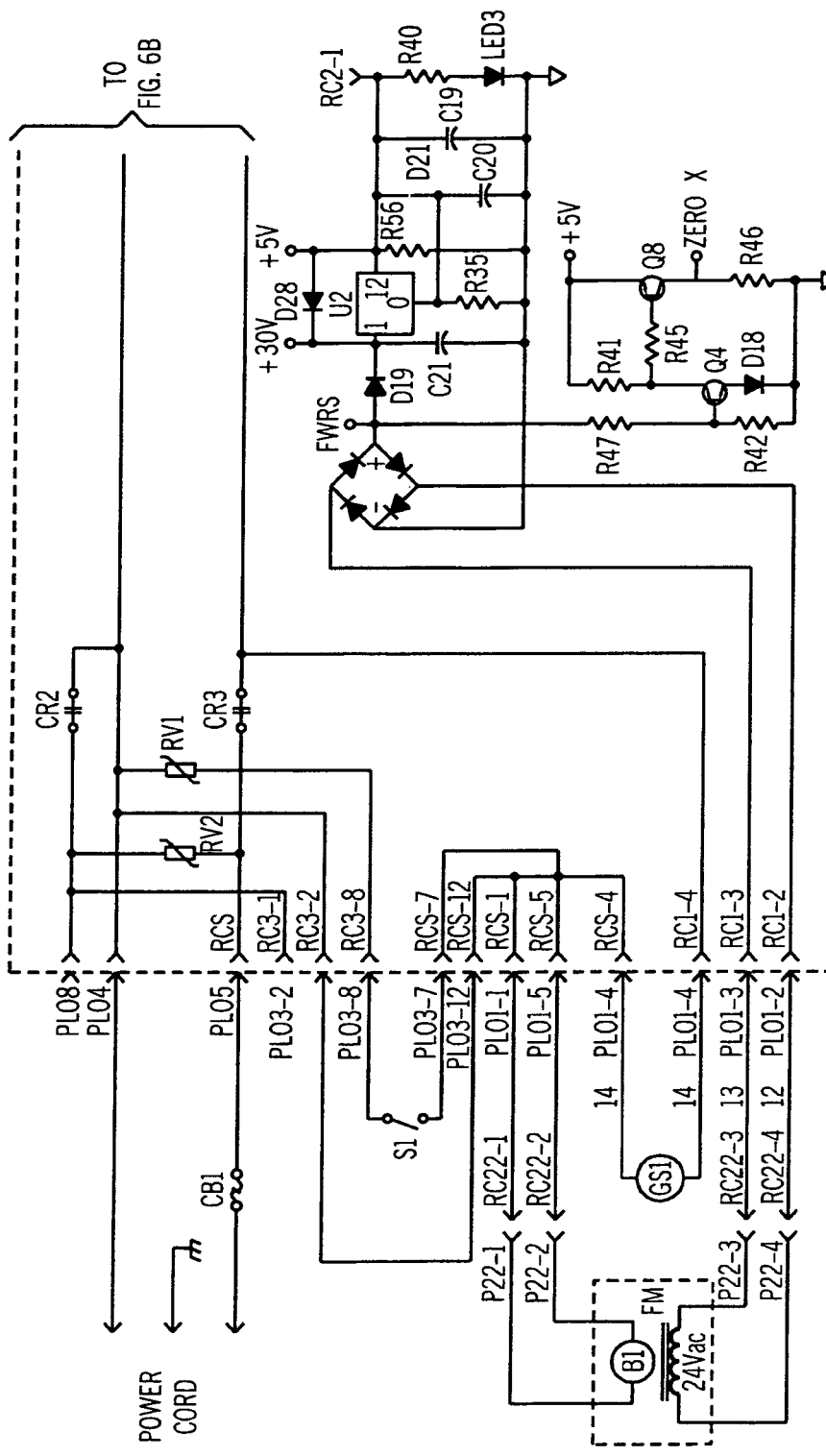
FIGS. 6A-6E is a schematic diagram illustrating an exemplary circuit for controlling operation of a welding system in accordance with another aspect of the present invention.
Figure 6B:
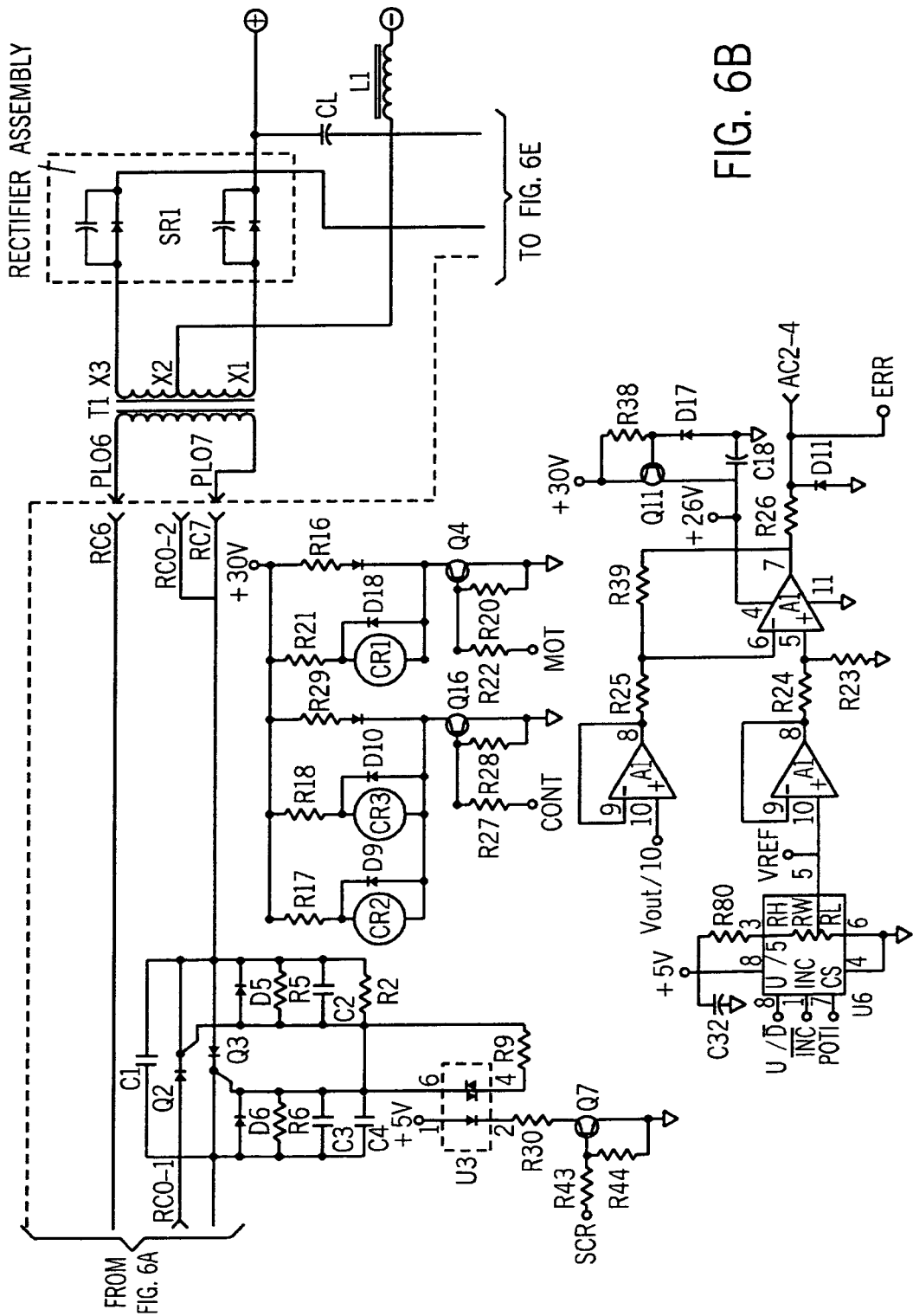
Figure 6C:
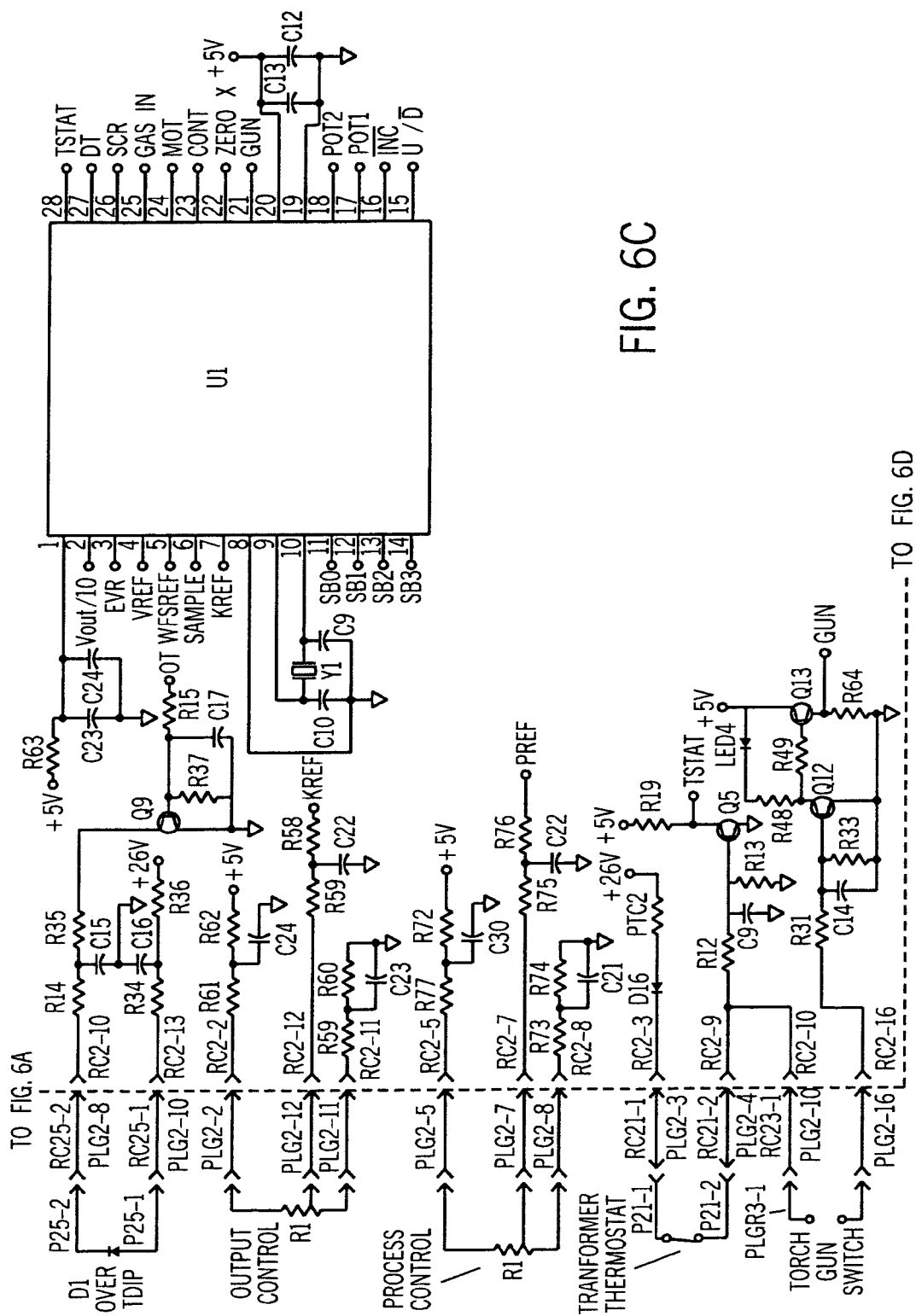
Figure 6D:
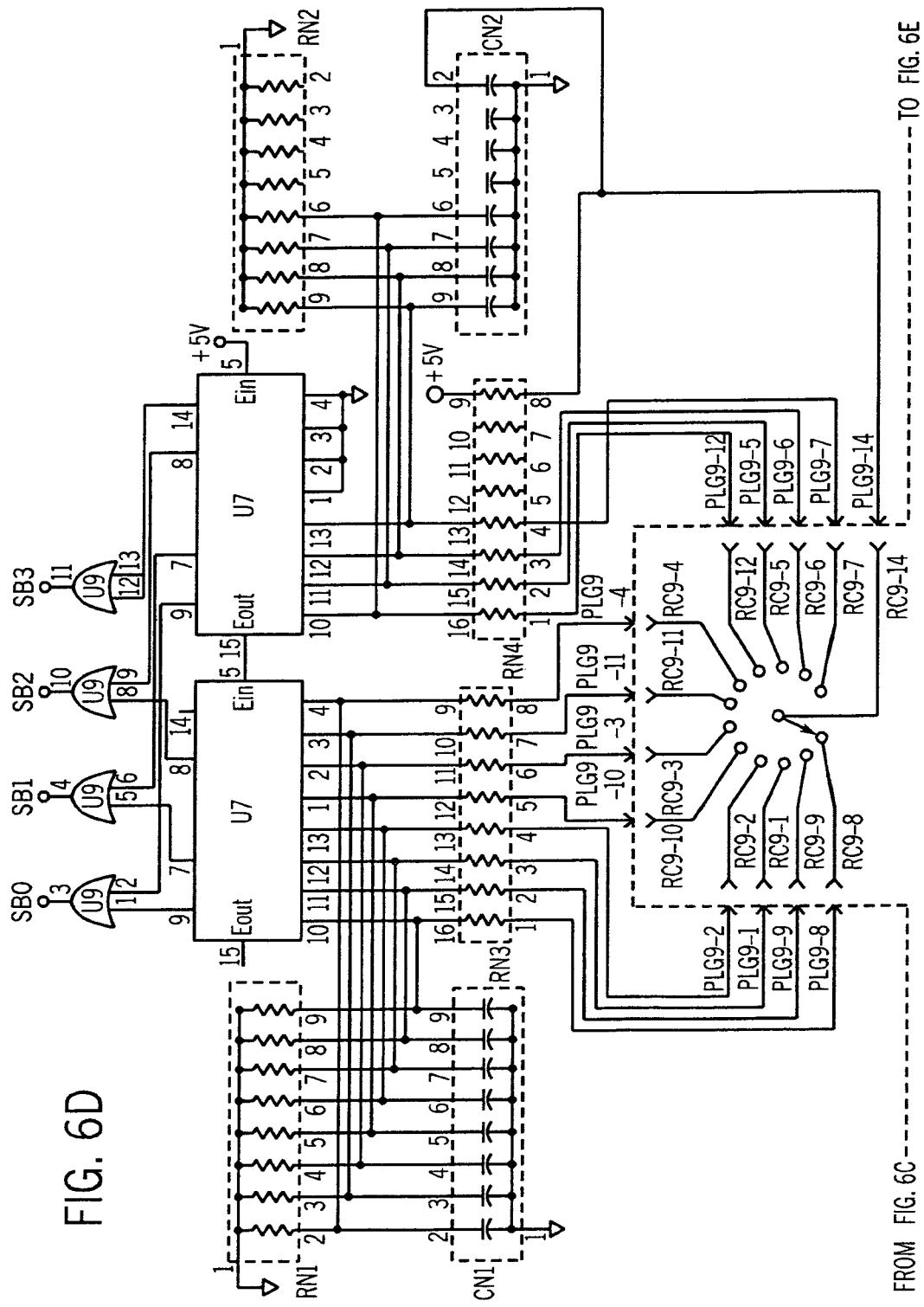
Figure 6E:
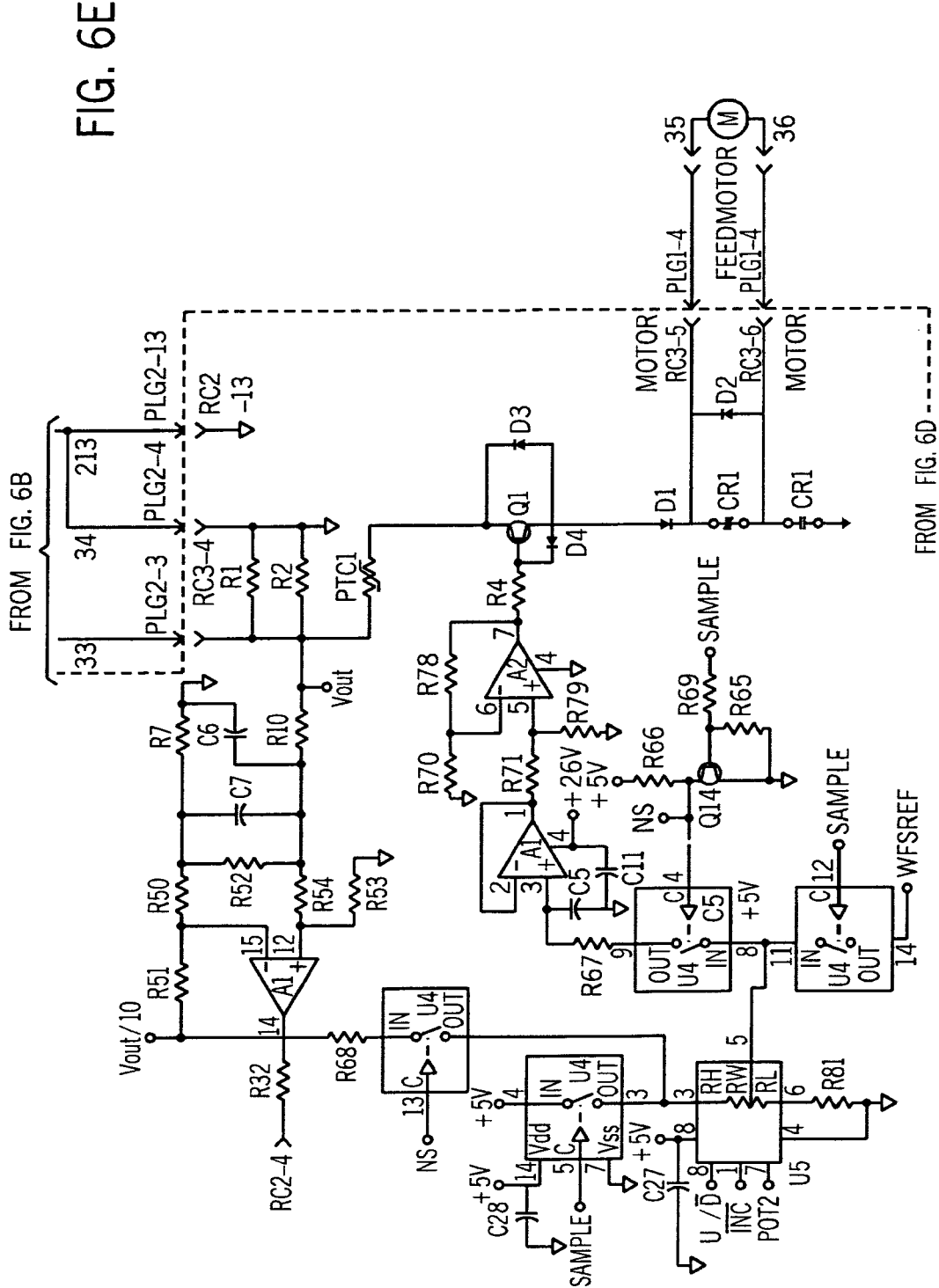

Referring now to FIG. 7, an alternate control panel 108 in accordance with an alternate embodiment of the present invention is shown. In the control panel illustrated in FIG. 7, in contrast to the control panel illustrated in FIG. 2, each position to which control knob 110 may be rotated defines a specific weld material thickness. Whereas each position to which control knob 36 of FIG. 2 could be rotated fell within a range of material thicknesses, control knob 110, illustrated in FIG. 7, may be rotated to one of a number of discrete material thickness positions. Additionally, it is contemplated that control knob 110 may be rotated to a position that does not specifically align with a known (marked) material thickness. In this regard, the user is allowed flexibility in identifying the material thickness setting. This flexibility allows an experienced user to tailor control of the wire feeder and other components of the welding system to fit particulars of the desired welding process. That is, while a user may be carrying out a welding process with a twenty gauge wire, positioning the control knob to be slightly misaligned with the position corresponding to "twenty gauge" wire may cause the wire feeder and/or power source to deliver a wire at a desired wire feed speed and weld voltage, respectively, that is more desirable for the user than that delivered if the control knob was precisely aligned with the "twenty gauge" marker. One skilled in the art will appreciate that the identified material thicknesses are merely exemplary and that other material thicknesses are contemplated.

Figure 8:
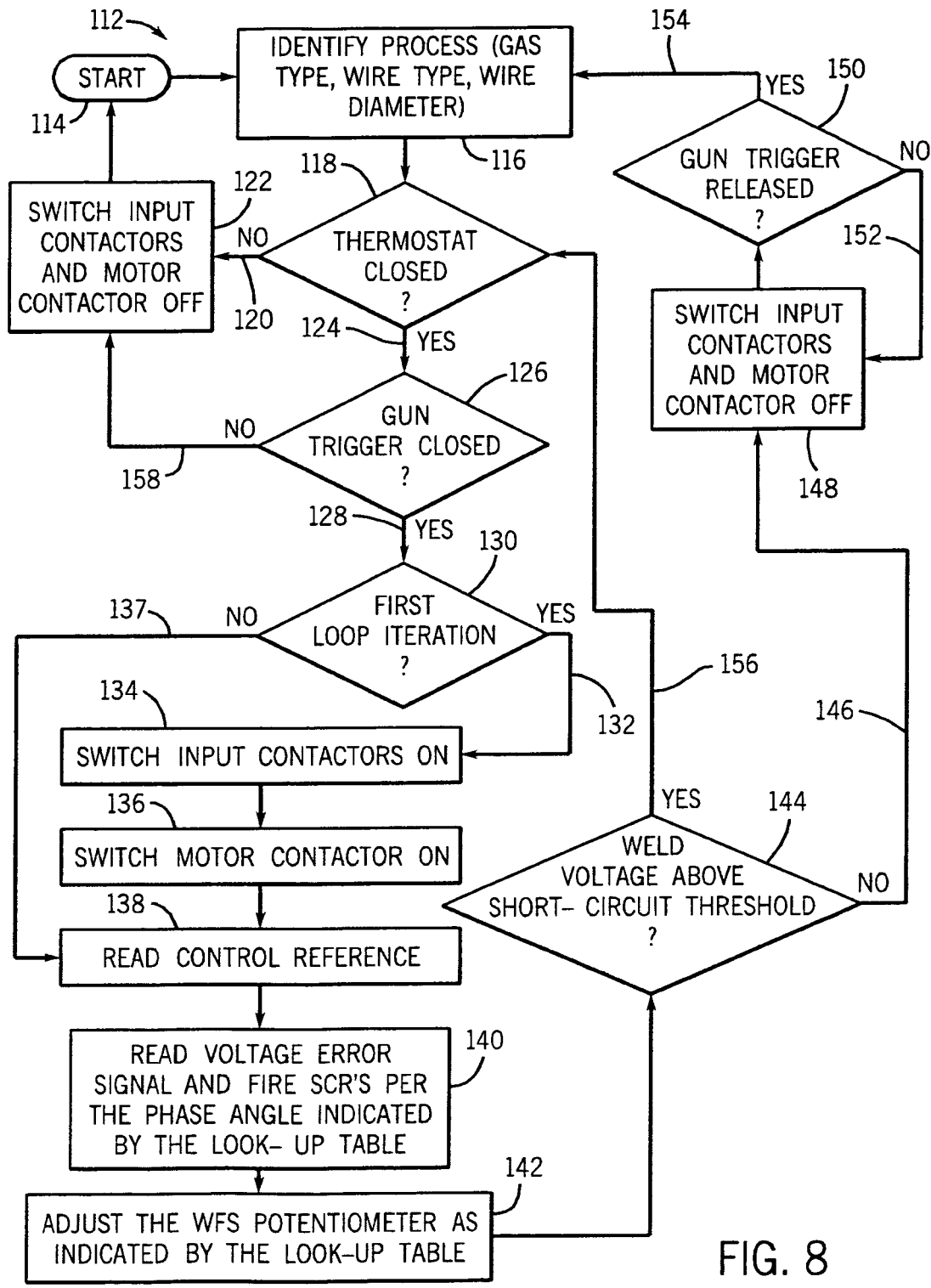
FIG. 8 is a flow chart setting forth the steps of parameter-determination process in accordance with another aspect of the present invention.

A process illustrating the processing steps carried out by a microcontroller-based embodiment of the present invention is illustrated in FIG. 8. In this embodiment, software, firmware, and hardware are integrally used to establish operating parameters of a welding process based on a single user-input. As illustrated, process 112 begins at START 114 with powering-up of the welding system. Powering-up of the system is preferably achieved through user selection of a dedicated ON/OFF switch, but may also be integrated with the single control knob. Thereafter, the microcontroller receives a user input 116 identifying a single parameter of the impending welding process. In a preferred embodiment, the single parameter is selected from a selector switch that is labeled with the wire type, gas type, and wire thickness of the wire that will be delivered to a weld during a welding process. The position of the process identity switch causes the controller to obtain a known set of predetermined welding parameters from a look-up table in memory. These parameters will be used to alter the weld voltage and wire feed speed settings per the adjustment of the single front panel control which is set to a material thickness setting.

Once the process identity is determined, the controller checks the thermostat status 118. If the thermostat contacts are open 120, 122, the controller switches the input contactors off and the motor input relay off 122. If the thermostat contacts are closed 118, 124, the controller awaits a gun switch closure 126. During this wait stage, the controller also monitors the process identity input device, e.g. control knob, for changes to the process identity input. In this regard, a user can change the identified parameter; however, as will be described, changes will not be permitted during welding.

Once welding is initiated, e.g. user activation of a gun trigger 126, 128, the welding process begins at 130, 132 by switching the input contactors ON 134 and the motor contactor ON 136. As will be described, steps 134-136 will not be repeated in subsequent loops 137. Process 112 continues by reading the material thickness control on the front panel 138. This control can be altered or "tweaked" by a user at any time during the welding process to fine tune the arc. A voltage control error signal is read in 140 and the firing of the SCRs adjusted accordingly to maintain the desired output voltage per the material thickness setting on the front panel control. The internal wire feed speed control potentiometer (preferably digital) is adjusted by the controller at 142 to obtain the desired wire feed speed per the material thickness setting on the front panel.

The output voltage (weld voltage) is monitored at 144 to assure that a short-circuit condition is not present at the torch tip. This is determined by comparing the sensed output voltage against a low voltage threshold. If the voltage remains below the threshold for a predetermined period of time, it can be determined that the gun tip is shorted to the workpiece. If a short-circuit condition is detected 144, 146, the input contactors and motor contactor are switched OFF 148. The system controller then awaits a release of the gun trigger 150 before proceeding. If the gun trigger has not been released 150, 152, the process loops back to step 148. In this regard, the process does not return to step 116 until the gun trigger is released 150, 154. The operator is expected to clear the shorted condition at this point. If no short-circuit condition exists in 144, 156, the controller loops back to check the thermostat and repeat the loop. This process will continue as long as the gun trigger remains closed 126. If the gun trigger is not closed 126, 158, the process proceeds to step 122 and the contactors are turned OFF 122.

The present invention advantageously eliminates user confusion in prescribing a welding session by presenting the system's output control relative to material thickness of the material to be welded. In this regard, the user selects the material thickness using the control knob or similar input device rather than adjusting output voltage and wire feed speed. Additionally, the present invention reduces the costs typically associated with wire feeders having synergic control systems that utilizes dual-mode and triple-mode controls and input devices. Furthermore, the present invention does not require any user programming.

Therefore, the present invention includes a welding-type system having a control panel that includes only a single input device configured to allow a user to input a single identifier of a welding-type process. The system further has operational circuitry configured to establish operating parameters for the welding-type process from the single identifier.

A controller is also presented and configured to receive a user-input identifying a consumable wire diameter and, from the user-input, determine operating parameters of a welding-type component. The controller is also configured to control the welding-type component to deliver an output consistent with the determined operating parameters.

The present invention also includes a welder having a single means for establishing a welding-type process as well as means for determining operating parameters for the welding-type process from an input to the single establishing means. The welder also has means for controlling the welding-type process consonant with the operating parameters.

As stated above, the present invention is also applicable with FCAW and MIG welding systems. The invention is also applicable with TIG and stick welding systems. As one skilled in the art will fully appreciate, the heretofore description of welding-type devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

The present invention has been described in terms of the preferred embodiment, and it is recognized that equivalents, alternatives, and modifications, aside from those expressly stated, are possible and within the scope of the appending claims.

What is claimed is:

1. A welding-type system comprising:
 a control panel having only a single input device configured to allow a user to input a single identifier to select a welding-type process from a number of different welding-type processes; and
 non-programmable operational hardware circuitry configured to establish operating parameters for the welding-type process from the single identifier.

2. The welding-type system of claim 1 wherein the single input device is embodied in a single control selector.

3. The welding-type system of claim 2 wherein the single control selector is a single control knob rotatably positionable to one of a plurality of positions.

4. The welding-type system of claim 3 wherein each position corresponds to a discrete material thickness to be welded.

5. The welding-type system of claim 3 wherein each position corresponds to a range of material thicknesses to be welded.

6. The welding-type system of claim 1 wherein the operating parameters established are at least one of a weld voltage and a wire feed speed of the welding-type system.

7. The welding-type system of claim 1 configured for at least one of MIG welding and FCAW.

8. The welding-type system of claim 1 having a wire feeder configured to deliver filler material to a weld, wherein the wire feeder speed is proportional to a weld voltage set by the non-programmable operational hardware circuitry.

9. The welding-type system of claim 8 wherein the filler material includes one of solid wire and flux-cored wire.

10. The welding-type system of claim 1 wherein the control panel further comprises an ON/OFF switch in addition to the single input device.

11. A controller configured to:
 receive a user-input identifying a material thickness to be welded;
 from the user-input, determine operating parameters of a welding-type component; and
 control the welding-type component to deliver an output consistent with the determined operating parameters, wherein the controller comprises only non-programmable hardware circuitry to set operating parameters of the welding-type component.

12. The controller of claim 11 further configured to automatically determine all operating parameters of the welding-type component from the user-input.

13. The controller of claim 11 further configured to receive the user-input from a variable-positionable control knob on a control panel of the welding-type component.

14. The controller of claim 13 further configured to determine the material thickness to be welded from a discrete position of the variable positionable control knob.

15. The controller of claim 14 further configured to automatically determine a weld voltage and wire feed speed from the user-input.

16. The controller of claim 15 wherein the wire feed speed is proportional to the weld voltage.

17. A welder comprising:
 a single means for receiving a user-input identifying a value for a single operating parameter of a welding-type process;
 means for determining at least one other operating parameter for the welding-type process from the user-input to the single receiving means; and
 means for controlling the welding-type process consistent with the operating parameters, wherein the means for controlling comprises only non-programmable hardware circuitry.

18. The welder of claim 17 integrated with a wire feeder, wherein the wire feeder speed is proportional to a weld voltage of the welder.

19. The welder of claim 18 wherein the single receiving means is a multi-positional knob rotatable to one of a number of input positions.

20. The welder of claim 19 wherein each input position identifies a material thickness to be welded.

21. The welder of claim 19 wherein each input position identifies a range of material thicknesses to be welded.

22. The welder of claim 18 further comprising means for determining a wire feed speed and a weld voltage from a position of the control knob, wherein the control knob position corresponds to a material thickness to be welded.

* * * * *